United States Patent
Burgoon et al.

(10) Patent No.: US 9,145,120 B2
(45) Date of Patent: Sep. 29, 2015

(54) SLIDING CALIPER PARKING BRAKE HAVING POSITIVE BRAKE PAD RETRACTION

(75) Inventors: Donald L. Burgoon, Gastonia, NC (US); Darin E. Cate, York, SC (US)

(73) Assignee: Performance Friction Corporation, Clover, SC (US)

( * ) Notice: Subject to any disclaimer, the term of this patent is extended or adjusted under 35 U.S.C. 154(b) by 0 days.

(21) Appl. No.: 13/229,044

(22) Filed: Sep. 9, 2011

(65) Prior Publication Data

US 2013/0062149 A1   Mar. 14, 2013

(51) Int. Cl.
| | |
|---|---|
| *F16D 55/22* | (2006.01) |
| *B60T 13/74* | (2006.01) |
| *F16D 55/2265* | (2006.01) |

(Continued)

(52) U.S. Cl.
CPC ............. *B60T 13/741* (2013.01); *F16D 55/227* (2013.01); *F16D 55/22655* (2013.01); *F16D 65/183* (2013.01); *F16D 65/54* (2013.01); *F16D 2121/06* (2013.01)

(58) Field of Classification Search
CPC ..... F16D 55/22; F16D 55/225; F16D 55/226; F16D 55/2265; F16D 55/227; F16D 59/02; F16D 2121/06; F16D 2121/12; F16D 2123/00
USPC ........ 188/72.3, 170, 73.45, 72.1, 72.4, 73.43, 188/73.44
See application file for complete search history.

(56) References Cited

U.S. PATENT DOCUMENTS 2,862,580 A * 12/1958 Burnett ........................ 188/72.5
2,926,757 A    3/1960 Armstrong
(Continued)

FOREIGN PATENT DOCUMENTS

DE    4304616 A1    8/1994
GB    1089987 A *  11/1967
(Continued)

OTHER PUBLICATIONS

International Search Report from International Application No. PCT/US2012/054447.
(Continued)

*Primary Examiner* — Thomas J Williams
(74) *Attorney, Agent, or Firm* — Roberts Mlotkowski Safran & Cole, P.C.

(57) ABSTRACT

A sliding caliper parking brake that positively retracts of both the outer and the inner brake pads upon de-actuation of the parking brake is provided. The parking brake includes a caliper body, a mounting assembly that slidably mounts the caliper body on the suspension of the vehicle so that is movable with respect to a brake rotor, and at least one piston assembly movably mounted in a bore in the caliper body and having an end connected to an inner brake pad. An outer brake pad is fixedly connected to the caliper body and is moved into engagement with an outer side of the brake rotor when the caliper body is moved along the mounting assembly as a result of the inner brake pad extending into engagement with the inner side of the brake rotor. The mounting assembly includes a resilient member, which may be one or Belleville springs, that restores the caliper body to an initial position that positively disengages the outer brake pad from the outer side of the brake rotor when the inner brake pad is retracted out of engagement with the inner side of the brake rotor, thereby preventing brake drag after the parking brake is released.

14 Claims, 3 Drawing Sheets

(51) Int. Cl.
*F16D 55/227* (2006.01)
*F16D 65/18* (2006.01)
*F16D 65/54* (2006.01)
*F16D 121/06* (2012.01)

(56) References Cited

U.S. PATENT DOCUMENTS

| | | | |
|---|---|---|---|
| 3,458,017 A | | 7/1969 | Szymski |
| 3,547,233 A | * | 12/1970 | Girvan ............... 188/170 |
| 3,800,920 A | | 4/1974 | Warwick |
| 4,364,455 A | * | 12/1982 | Oshima ............... 188/72.3 |
| 4,494,630 A | | 1/1985 | Stoka et al. |
| 4,537,288 A | * | 8/1985 | Stoka ............... 188/71.8 |
| 4,613,018 A | * | 9/1986 | Weiler et al. ............... 188/72.4 |
| 4,766,981 A | | 8/1988 | Harrison |
| 4,858,728 A | * | 8/1989 | Thiel et al. ............... 188/73.31 |
| 4,887,696 A | * | 12/1989 | Redenbarger et al. ....... 188/72.3 |
| 5,249,647 A | * | 10/1993 | Kobayashi et al. ........... 188/72.3 |
| 5,284,228 A | * | 2/1994 | Weiler et al. ............... 188/72.3 |
| 5,613,577 A | | 3/1997 | Collin |
| 5,701,978 A | * | 12/1997 | Weiler et al. ............... 188/73.32 |
| 6,367,591 B1 | * | 4/2002 | Gosda ............... 188/71.8 |
| 6,543,585 B2 | * | 4/2003 | Stinson ............... 188/71.8 |
| 2009/0026024 A1 | * | 1/2009 | Baldeosingh et al. ....... 188/72.3 |

FOREIGN PATENT DOCUMENTS

| | | | |
|---|---|---|---|
| GB | 1151193 A | * | 5/1969 |
| JP | 53065568 A | * | 6/1978 |
| JP | 56028328 A | * | 3/1981 |

OTHER PUBLICATIONS

International Preliminary Report on Patentability from International Application No. PCT/US2012/054447.

* cited by examiner

SLIDING CALIPER PARKING BRAKE HAVING POSITIVE BRAKE PAD RETRACTION

FIELD

This invention generally relates to brake calipers, and is specifically concerned with a sliding caliper parking brake that positively retracts both the inner and outer brake pads from the brake rotor when the parking brake is released.

BACKGROUND

Disc-type parking brakes utilizing sliding calipers are known in the prior art. Such parking brakes generally include a caliper body slidably mounted on a pair of parallel pins affixed to the vehicle suspension. Such a mounting allows the caliper body to slide back and forth a short distance parallel to the axis of rotation of the wheel. The caliper body has a slot-shaped recess that receives the outer periphery of a brake rotor. On one side of the recess, the caliper body includes a pair of cylindrical bores that house a pair of spring-loaded brake pistons. These pistons are connected to an inner brake pad that is extendible toward and retractable away from the brake rotor. An outer brake pad is connected to the caliper body on the outer wall of the rotor-receiving recess opposite to the inner brake pad such that the outer periphery of the brake rotor is disposed between the inner and outer brake pads.

When the vehicle is in operation, the brake pistons are retracted against the force of their internally-contained springs by pressurized brake fluid acting against the front ends of the pistons. When the vehicle is stopped and the parking brake is actuated, the pressurized brake fluid is released from the bores housing the pistons, which allows the piston springs to extend the pistons toward the brake rotor. The extended brake pistons forcefully engage the inner brake pad against the inner surface of the brake rotor. This engagement force reacts against the slidably mounted caliper body, causing it to slide on the mounting pins a small distance away from the rotor, thereby pulling the outer brake pad (which is connected to the caliper body on the outer wall of the rotor-receiving recess) into engagement against the outer surface of the brake rotor. To release the parking brake, pressurized brake fluid is re-admitted into the front ends of the cylindrical recesses in the caliper body. The resulting hydraulic force pushes against the front face of the brake pistons against the force of their internally-contained springs, thereby retracting the pistons and the inner brake pad from the brake rotor. The outer pad separates from the brake rotor disc as a result of the "knock back" force the rotor applies against the outer pad when the inner brake pad is released and the rotor rotates.

Such sliding caliper parking brakes have a number of advantages. The ability of the caliper body to slide in the axial direction upon the actuation of the brake allows the brake pistons to be mounted on only one side of the caliper body, thereby simplifying construction, reducing parts and reducing the size and weight of the brake. The use of spring force instead of hydraulic force to extend the brake pistons allows the parking brake to reliably apply a braking force against the brake rotor without power from the vehicle, and regardless of whether pressurized brake fluid is available or leaks out of the piston bores of the caliper body.

SUMMARY

The applicants have observed that such sliding caliper parking brakes also have a substantial disadvantage that results in serious caliper drag issues. Specifically, while the inner brake pad is positively separated from the brake rotor as a result of the hydraulic retraction of the brake pistons, only the reaction force that the moving rotor applies to the outer brake (known as "knock back" in the art) is relied upon to separate the outer brake pad from the rotor. The applicants have observed that the exclusive reliance on rotor knock-back in prior art pin-sliding caliper parking brakes often results in substantial amounts of drag between the outer brake pad and the rotor. Such drag increases pad wear which in turn requires more frequent brake pad replacement. Moreover, the delayed retraction of the outer pad from the rotor causes uneven wear patterns between the inner and outer pads, thereby compromising the ability of the parking brake to apply sufficient braking forces. Such drag also increases fuel consumption since the vehicle engine must overcome the frictional forces applied by the lagging outer pad against the brake rotor. If the magnitude of the drag is high enough the resulting heat can damage the brake rotor and components of the caliper.

The invention is a sliding caliper parking brake that solves the aforementioned problems by providing positive retraction of the outer brake pad upon de-actuation of the parking brake. To this end, the invention comprises a caliper body; a mounting assembly that movably mounts the caliper body with respect to a brake rotor; an inner brake pad that is extendible from and retractable toward the caliper body into engagement and disengagement with an inner side of the brake rotor; and an outer brake pad fixedly connected to the caliper body that is moved into engagement with an outer side of the brake rotor when the caliper body slidably moves along the mounting assembly as a result of the inner brake pad extending into engagement with the inner side of the brake rotor.

To prevent drag between the outer brake pad and the rotor, the mounting assembly includes a resilient member that slides the movable caliper body back to its initial, pre-braking position with respect to the brake rotor when the parking brake is released. Such movement of the caliper body positively disengages the outer brake pad from the outer side of the brake rotor when the inner brake pad is retracted out of engagement with the inner side of the brake rotor. In the preferred embodiment, the mounting assembly includes at least one track member, such as a pair of parallel pins mounted on the vehicle suspension that slidably engage complementary-shaped parallel bores in the caliper body. The resilient member may include at least one spring, and is preferably formed from one or more Belleville springs. The stroke length of the resilient member of the mounting assembly is pre-selected to be about one-half of a stroke length of the inner brake pad so that the rotor is centered between the inner and outer brake pads when the parking brake is released.

The mounting assembly may include a self-adjusting stroke length mechanism that maintains the stroke length of the resilient member to about one-half of the stroke length of the inner brake pad despite wear on the inner brake pad. This mechanism may include a retaining member that retains the resilient member of the mounting assembly and which is frictionally engaged to the track member. The frictional engagement between the retaining member and track member is sufficient to prevent the retaining member from sliding on the track member when the resilient member is compressed a preselected distance equal to about one-half the stroke length of a wear-free inner pad, but insufficient to prevent said retaining member from sliding on said track member when the resilient member is compressed beyond the preselected distance. Hence when the stroke length of the resilient member is lengthened as a result of wear on the outer pad, the retaining member automatically slips to maintain the stroke length of the resilient member to a distance equal to about one-half of the stroke length of the inner brake pad.

The piston assembly may also include a piston movably mounted in a bore in the caliper body and having an end connected to the inner brake pad, a retention cap affixed to the caliper body that faces an opposite end of the piston, and at least one spring member disposed between the piston and the retention cap. The piston is retractable away from said brake rotor by the application of pressurized hydraulic fluid on a face of the piston, and extendible toward said brake rotor by the application of spring force from the spring member between the piston and the retention cap. The retention cap may include an adjustment member such as a screw that adjusts both the stroke length of the spring member and an amount of engagement force that the inner brake pad applies to the inside surface of the brake rotor.

BRIEF DESCRIPTION OF THE DRAWINGS

FIG. 1 is a front side view of the sliding caliper parking brake of the invention, illustrating the caliper, brake rotor and vehicle suspension upright (in phantom) that the caliper is attached to;

DETAILED DESCRIPTION OF THE EMBODIMENTS

Figure 1:
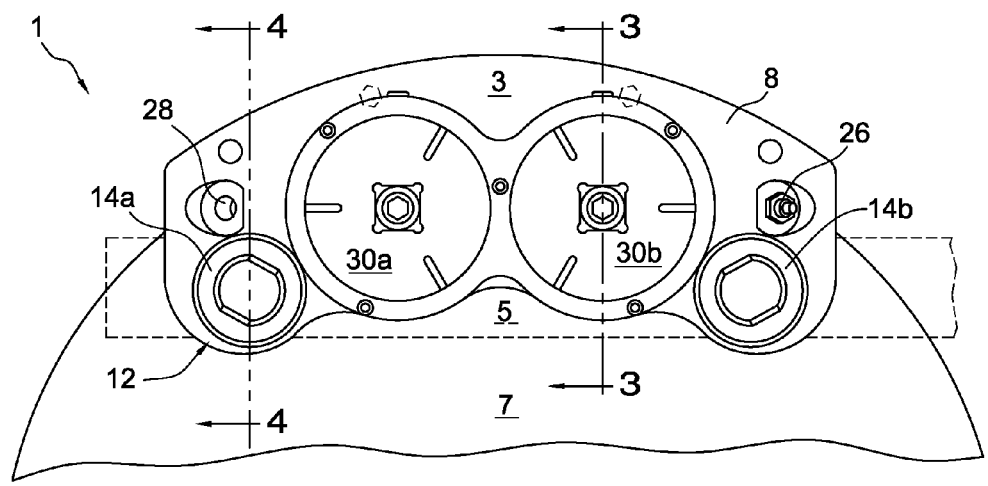
Figure 2:
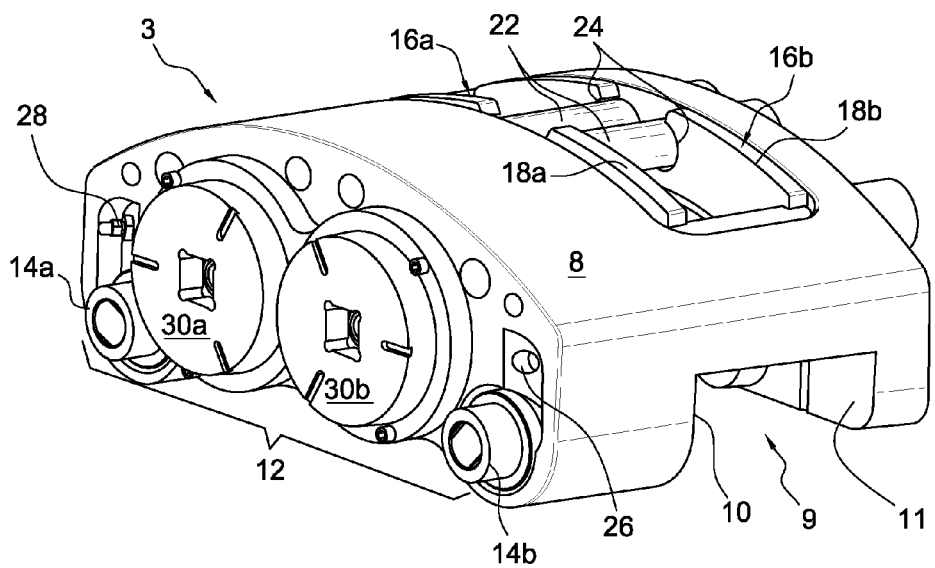
FIG. 2 is a perspective view of the caliper of the parking brake of FIG. 1.

With reference to FIGS. 1 and 2, the sliding caliper parking brake 1 of the invention generally comprises a caliper 3 mounted on the upright 5 of a vehicle suspension (shown in phantom), and a disc-shaped brake rotor 7 that is connected to the hub of a vehicle wheel (not shown). The caliper 3 includes a caliper body 8 having an arcuate recess 9 on its right side. The recess 9 includes an inner wall 10 and an outer wall 11 and receives the outer periphery of the brake rotor 7. The caliper body 8 is connected to the upright 5 of the vehicle suspension by a mounting assembly 12 that movably mounts the caliper body 8 with respect to the brake rotor 7. To this end, mounting assembly 12 includes a pair of slide pins 14a, 14b on opposite ends of the caliper body 8. As will be described in more detail hereinafter, each of the pins 14a, 14b slidably extends through a bore in the caliper body 8. The threaded ends of the pins 14a, 14b are screwed in to the upright 5. The upright 5 extends through the recess 9 of the caliper body 8 adjacent to the inner wall 10. The caliper 3 is slidably movable a short distance along the shanks of the slide pins 14a, 15b in a direction parallel to the axis of rotation of the brake rotor 7 upon actuation and release of the parking brake 1.

Figure 3:
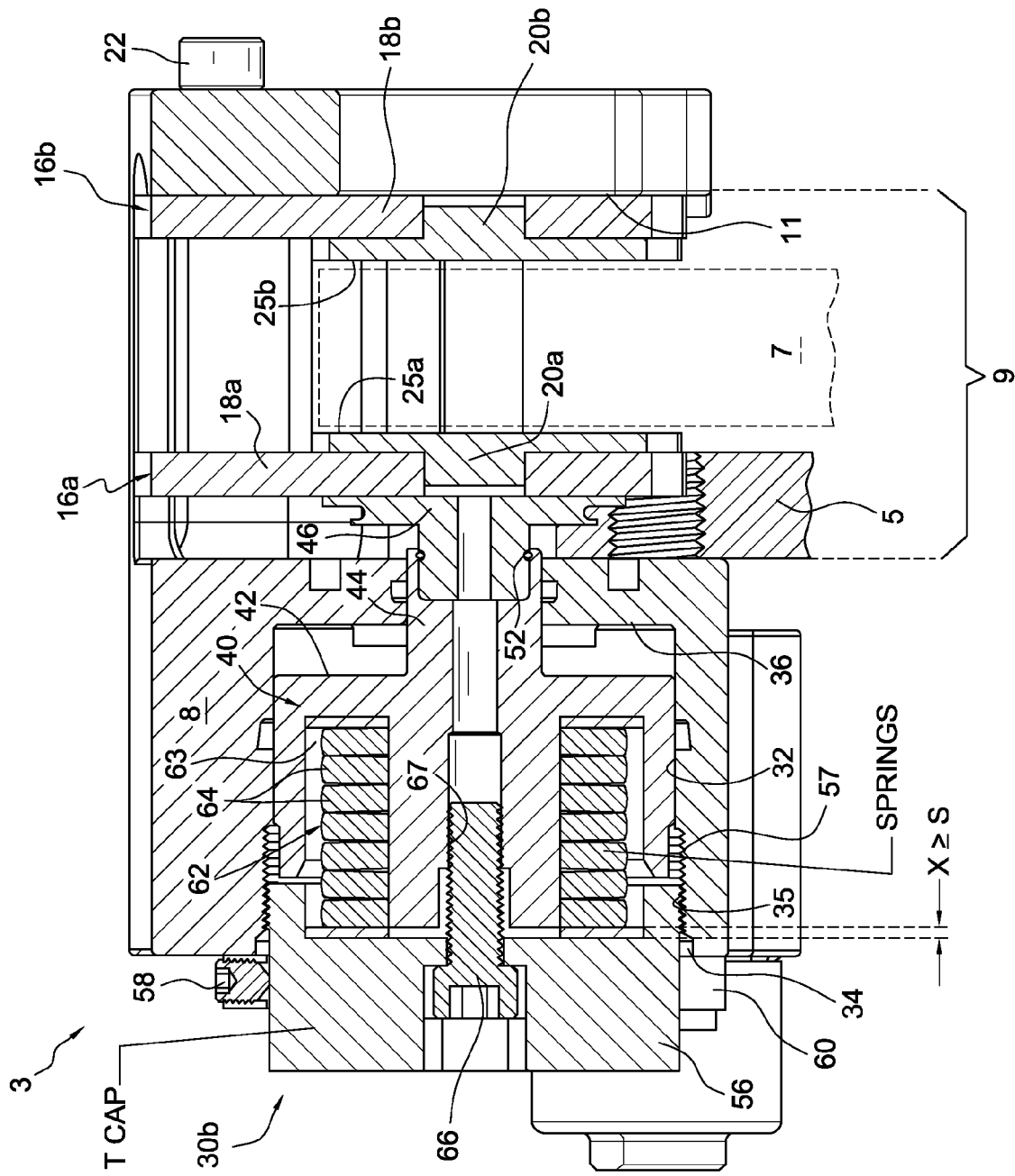
FIG. 3 is cross sectional side view of the parking brake of FIG. 2 along the section line 3-3.

As illustrated in FIGS. 2 and 3, the recess 9 of the caliper body 8 further includes inner and outer brake pads 16a, 16b arranged in opposition to one another, each of which includes a metal backing plate 18a, 18b and a pad 20a, 20b. As will be described in more detail hereinafter, the inner brake pad 16a is mounted on the ends of a pair of piston assemblies which extend and retract the pad 16a toward and away from the brake rotor 7. The outer brake pad 16b is mounted on the outer wall 11 of the recess 9 of the caliper body 3. Outer brake pad 16b is engaged to and disengaged from the brake rotor 7 as a result of the reactive force generated against the caliper 3 when the inner brake pad 16a engages the brake rotor 7, and the sliding movement afforded to the caliper 3 from the slide pins 14a, 14b forming the mounting assembly 12. As is best seen in FIG. 2, the top side of the recess 9 of the caliper body 8 includes guide pins 22 that are slidably received in recesses 24 in the outer edges of the backing plates 18a, 18b of the brake pads 16a, 16b. These guide pins 22 maintain a parallel relationship between the flat pad surfaces 25a, 25b of the brake pads 16a, 16b. The front side of the caliper body 8 includes a brake fluid inlet 26 and outlet 28 for the operation of piston assemblies 30a and 30b connected to the inner brake pad 16a.

As is best seen in FIG. 3, each of the piston assemblies 30a, 30b is housed within a cylindrical bore 32. Each of the bores 32 has an open end 34 in the front side of the caliper body 8 that is circumscribed by threads 35, and which terminates in an annular wall 36 as shown. Each of the piston assemblies 30a, 30b includes a piston 40 having an annular front face 42 that is spaced apart from the annular wall 36 at the end of the bore 32. The piston 40 includes a concentric, integrally-formed stem 44 that projects outwardly from the front face 42 as shown. The distal end of the stem 44 is coupled to a circular mounting plate 46 which is in turn affixed via a screw (not shown) to the backing plate 18a of the brake pad 16a. The piston stem 44 includes a recess 48 that receives a boss 50 projecting from the back of the mounting plate 46. The stem 44 and boss 46 are coupled together by a retaining ring 52 snapped into axially aligned annular recesses (not specifically shown) circumscribing the stem 44 and boss 50. Although not specifically shown in the several Figures, the brake fluid inlet 26 and outlet 28 are connected to passageways in the caliper body 8 that end in the annular wall 36 so that pressurized brake fluid may be injected into the space between the front face 42 of the piston 40 and the annular wall 36 to release the parking brake 1, or bled from this space to actuate the parking brake 1. Piston 40 further has a back wall 54 as shown.

Each of the piston assemblies 30a, 30b further includes a retaining cap 56. Cap 56 has screw threads 57 that are engaged to the screw threads 35 circumscribing the open end 34 of the cylindrical bore 32. A radially-oriented set screw 58 mounted in a figure-8 shaped retaining ring 60 secures the retaining cap 56 into position with respect to the threaded open end 34 of the bore 32. The retaining cap 56 has a front wall 61 that faces the back wall 54 of piston 40. Each of the piston assemblies 30a, 30b further includes a piston spring 62 within an annular recess 63 within the piston 40. In this example of the invention, piston spring 62 is formed from a stack of Belleville springs 64 that are compressed between the piston 40 and the retaining cap 56 so that the piston 40 is spring-biased toward the brake rotor 7. Each of the piston assemblies 30a, 30b also includes a pre-load adjustment screw 66 whose threads are engaged to a threaded bore 67 disposed in the piston 40 and aligned with its axis of rotation. The adjustment screw 66 adjusts the distance "X" between the back wall 54 of the piston 40 and the front wall 61 of the retaining cap 56, and is used both to initially adjust the engagement force that the inner brake pad 16a applies to the brake rotor 5, and to re-adjust this engagement force as the brake pads 16a, 16b and brake rotor 7 wear down. This distance "X" should be set slightly longer than a stroke distance "S" of the pistons 40 required for a braking operation to ensure that the full compressive force of the piston springs 62 is used to engage the brake pads 16a, 16b against the sides of the rotor.

Figure 4:
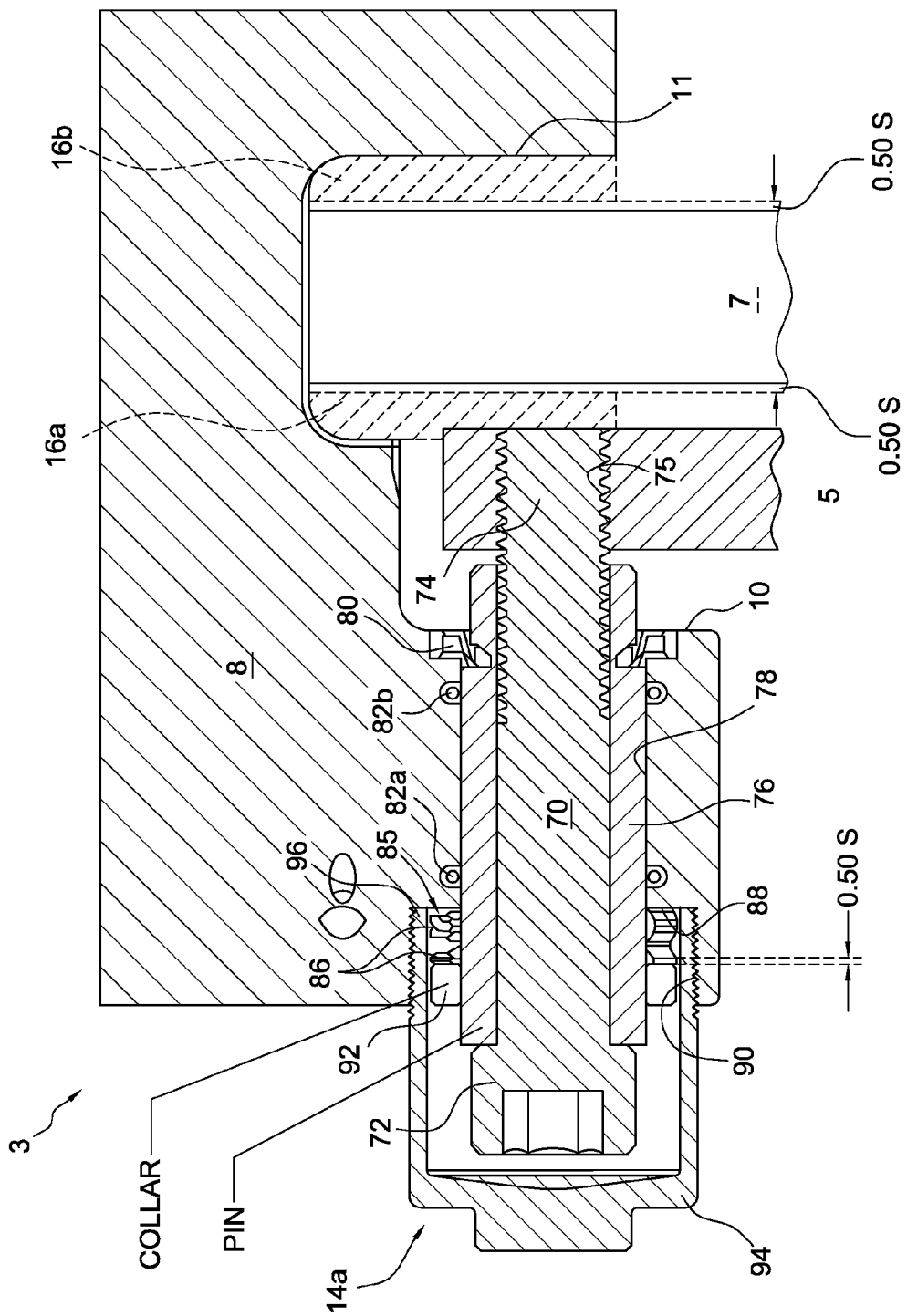
FIG. 4 is cross sectional side view of the parking brake of FIG. 2 along the section line 4-4.

FIG. 4 illustrates the structure of the slide pins 14a, 14b of the mounting assembly 12 of the parking brake 1. Each of the slide pins 14a, 14b includes bolt 70 having a head portion 72 extending out of the front side of the caliper body 8, and a threaded end screwed into a threaded bore 75 in the upright 5 of the vehicle suspension. The shank of the bolt 70 is slidably received within a tubular sleeve 76 which in turn is slidably received within a bore 78 in the caliper body 8. An annular dust boot 80 circumscribes the distal end of the sleeve 76 in order to keep dust and debris from accumulating between the outer surface of the sleeve 76 and the surface of the bore 78. O-rings 82a, 82b are provided to keep the sleeve 76 centered within the bore 78 when the parking brake 1 is released. These O-rings 82a, 82b are retained in annular grooves circumscribing the bore 78 and surround both the bore 78 and the sleeve 76.

Most importantly, each of the slide pins 14a, 14b includes a resilient member 85 in the form of a stack of Belleville springs 86 which applies a restorative force to the caliper 3 after the parking brake is released. While a stack of Belleville springs 86 are used in this example of the invention, a coil spring, leaf spring, one or more pieces of elastomeric material or a single Belleville spring could also be used. These Belleville springs 86 are captured between an annular bottom wall 88 of a threaded annular recess 90, and a split ring retention collar 92 frictionally engaged around the proximal end of the sleeve 76. It is important to note that the distance "D" that the Belleville springs 86 may be compressed is larger than the half-stroke distance 0.50 "S" that the springs 86 are actually compressed during the operation of the brake 1. A dust cap 94 (shown in FIG. 4 but not shown in FIGS. 1 and 2) having a threaded end 96 is screwed into the threaded annular recess 90 of the caliper body 8 to protect the proximal end of the slide pin 14a from dust and debris.

The operation of the parking brake 1 will now be described with reference to FIGS. 2, 3, and 4. Prior to the operation of the parking brake 1, the stroke distance "X" of the piston spring 62 is adjusted via central adjustment screw 66. This stroke distance (shown in FIG. 3) is defined as the distance between the back wall 54 of the piston 40 and the front wall 61 of the retaining cap 56 when the piston spring 62 is fully extended (i.e. not compressed by pressurized brake fluid acting on the piston 40), and is adjusted to a distance X which will result in brake pads 16a, 16b engaging the inner and outer sides of the brake rotor 7. It should be noted that the stroke distance X is somewhat larger than or just about equal to an actual stroke distance S that the pistons 40 will move in engaging the brake pads 16a, 16b against the sides of the brake rotor 7. Such an adjustment of the stroke distance X ensures that the piston-springs 62 will be able to apply sufficient braking force to the rotor 7 even after the pads 16a, 16b and rotor have experienced some degree of wear.

When the parking brake 1 is actuated, the brake fluid outlet 28 is opened to allow pressurized brake fluid to bleed out of the space between the annular wall 36 of the bore 32 and the piston face 42 in each of the piston assemblies 30a, 30b. Consequently, the force that the piston spring 62 applies to the piston 40 of each of the piston assemblies 30a, 30b moves the brake pad 16a connected to the piston stem 44 into engagement with the inner side of the brake rotor 7. This brake engagement force generates an equal and opposite reaction force between the brake rotor 7 and the caliper body 8 that pushes the left side of caliper body 8 away from the brake rotor 7. Because the caliper body 8 is slidably movable with respect to the brake rotor 7 via the sliding pin assemblies 14a, 14b, the caliper body 8 slides to the left in FIG. 4 away from the vehicle suspension upright 5. Such sliding movement causes the outer wall 11 of the recess 9 of the caliper body 8 to move toward the outer side brake rotor 7, which in turn engages outer brake pad 16b against the outer side of the brake rotor 7. At the same time, this leftward movement caused by the piston springs 62 overcomes the spring force applied to the caliper body 8 by the resilient member 85 formed by the spring stack 86 and compresses it. At the completion of the actuation operation, the piston 40 of each of the piston assemblies 30a, 30b has extended toward the rotor 7 a total distance of S while each of the resilient members 85 has been compressed a distance 0.50 S away from the rotor 7 and each of the brake pads 16a, 16b has moved a distance 0.50 S toward the rotor.

When the parking brake 1 is released into a de-actuated state, pressurized brake fluid is admitted back into the space between the annular wall 36 of the bore 32 and the piston face 42 in each of the piston assemblies 30a, 30b through the fluid inlet 26 shown in FIG. 2. The resulting hydraulic pressure overcomes the spring force applied to the pistons 30 by piston springs 62, causing the inner brake pad 16a to disengage from the inner side of the brake rotor 7 and move away from the rotor a distance of 0.50 S. Simultaneously, the restorative force that the compressed resilient members 85 apply to the caliper body 8 pushes it toward the brake rotor upright 5 of the vehicle suspension, which in turn forces the outer brake pad 16b away from the outer surface of the brake rotor 7. The applicants have noted that because the pistons 30 positively withdraw the inner brake pad 16a a distance of 0.50 via pressurized brake fluid, that the stroke of the resilient members 85 need only be 0.50 S to positively withdraw the outer brake pad 16a away from the brake rotor 7 the same distance that the pistons 30 withdraw the inner brake pad 16b from the brake rotor 7. The use of a spring stroke of only 0.50 S instead of S in turn minimizes any diminishment of the engaging force between the brake pads 16a, 16b and the brake rotor 7 that might be caused by the resilient members 85 when the parking brake 1 is actuated.

The positive disengagement force that the resilient members 85 of the slide pins 14a, 14b apply between the outer brake pad 16b and the outer surface of the brake rotor 7 eliminates the brake drag which would otherwise occur, with all of the attendant disadvantages of premature wear on the brake pads and rotor and decreased vehicle fuel mileage.

As the brake pads 16a, 16b and inner and outer surfaces of the brake rotor 7 wear down over time, the stroke distance that each of the brake pads 16a, 16b must move in order to engage its respective side of the brake rotor 7 also increases. Stated differently, the absolute length of 0.50 S increases. If the inner and outer brake pads are to retract the same distance from the inner and outer surfaces of the brake rotor 7 when the parking brake 1 is released, some provision must be made to increase the stroke of the slide-pin spring stacks 86 to compensate for this wear of the brake pad and rotor surfaces.

Such a stroke increase is accomplished by means of the split-ring collar 92 that circumscribes the outer surface of the tubular sleeve 76 of each of the slide-pin assemblies 14a, 14b. The frictional engagement force between the split-ring collar 92 and the outer surface of the tubular sleeve 76 is set to a value that is high enough to retain the slide-pin spring stack 86 when the spring stack is compressed a distance corresponding to 0.50 S when the brake pads 16a, 16b and rotor are unworn, but low enough so that the collar 92 slips when the spring stacks 62 compress the slide-pin spring stacks 86 a distance greater than the initial value of 0.50 S as the brake pads 16a, 16b and brake rotor 7 wear. In this manner, the frictionally-engaged split collar 92 affords self-adjustability to the stroke of the slide-pin spring stacks 86 so that their restorative spring stroke increases as the stroke length of the pistons 40 increases over the lifetime of the parking brake 1. The end result is that the slide-pin spring stacks 86 retract the outer brake pad 16b away from the outer surface of the brake rotor the same distance that the pistons 40 retract the inner brake pad 16a away from the inner surface of the rotor 7 (i.e. 0.50 S) despite the gradual increase in the length of 0.50 S as a result of brake wear.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A sliding caliper parking brake, comprising:
    a caliper body including a pair of guide pins that slidably extend through complementary-shaped openings located on opposite sides of the caliper body;
    a mounting assembly including a pair of slide pins that permit the caliper body to slide with respect to a brake rotor;
    an inner brake pad that is extendible toward and retractable from the caliper body into engagement and disengagement respectively with an inner side of the brake rotor;
    an outer brake pad fixedly connected to the caliper body that is moved into engagement with an outer side of the brake rotor when the caliper body is moved along the mounting assembly as a result of the inner brake pad extending into engagement with the inner side of the brake rotor; and
    a resilient member included within the mounting assembly that restores the caliper body to an initial position that positively disengages the outer brake pad from the outer side of the brake rotor when the inner brake pad is retracted out of engagement with the inner side of the brake rotor, including a sleeve slidably engaged to a complementary-shaped recess in the caliper body and a retaining member frictionally engaged to the sleeve that retains the resilient member;
    wherein the inner brake pad is fixedly connected to one end of a piston, and said inner and outer brake pads have backing plates with recesses which slidably receive said pair of guide pins.

2. The sliding caliper parking brake of claim 1, wherein the piston is retractable away from said brake rotor by the application of pressurized hydraulic fluid on a face of the piston, and extendible toward said brake rotor by the application of force from a spring member on the piston.

3. The sliding caliper parking brake of claim 2, wherein the mounting assembly includes a self-adjusting stroke length mechanism that maintains a stroke length of the resilient member to about one-half of a stroke length of the inner brake pad despite wear on the inner brake pad.

4. The sliding caliper parking brake of claim 3, wherein the self-adjusting stroke length mechanism includes the sleeve that retains the resilient member, and wherein the frictional engagement between the retaining member and sleeve is sufficient to prevent the retaining member from sliding on the sleeve when the resilient member is compressed a preselected distance equal to about one-half the stroke length of a wear-free inner pad, but insufficient to prevent said retaining member from sliding on said sleeve when the resilient member is compressed beyond said preselected distance.

5. The sliding caliper parking brake of claim 1, further comprising a piston assembly wherein the piston assembly further includes a retention cap affixed to the caliper body facing an opposite end of the piston, and at least one spring member disposed between the piston and the retention cap for applying a force on the piston that extends it toward the brake rotor.

6. The sliding caliper parking brake of claim 5, wherein the retention cap adjusts a stroke length of the spring member and an amount of engagement force that the inner brake pad applies to the inside surface of the brake rotor.

7. The sliding caliper parking brake of claim 5, wherein the spring member is formed from a plurality of Belleville springs.

8. The sliding caliper parking brake claim 1, wherein the resilient member includes at least one Belleville spring or wave spring.

9. The sliding caliper parking brake of claim 1, wherein a stroke length of the resilient member of the mounting assembly is about one-half of a stroke length of the inner brake pad.

10. A sliding caliper brake, comprising:
    a caliper body including a pair of guide pins that slidably extend through complementary-shaped openings located on opposite sides of the caliper body;
    a mounting assembly including a pair of slide pins that permit the caliper body to slide with respect to a brake rotor;
    an inner brake pad that is engageable against and disengageable from an inner side of the brake rotor;
    an outer brake pad fixedly connected to the caliper body that is moved into engagement with an outer side of the brake rotor when the caliper body is moved along the mounting assembly as a result of a piston assembly extending the inner brake pad into engagement with the inner side of the brake rotor,
    wherein the mounting assembly includes a sleeve slidably engaged to a complementary-shaped recess in the caliper body and a retaining member frictionally engaged to the sleeve that retains a restoring spring that restores the caliper body to an initial position that positively disengages the outer brake pad from the outer side of the brake rotor about a same distance that the inner brake is disengaged from the inner side of the brake rotor when the inner brake pad is retracted out of engagement with the brake rotor,
    wherein the inner brake pad is fixedly connected to an end of the piston assembly, and said inner and outer brake pads have backing plates with recesses which slidably receive said pair of guide pins.

11. The sliding caliper brake of claim 10, wherein the restoring spring has a stroke length that is about one-half of a stroke length of the inner brake pad.

12. The sliding caliper brake of claim 10, wherein the mounting assembly includes a self-adjusting stroke length mechanism that maintains a stroke length of the restoring spring to about one-half of a stroke length of the piston assembly that engages the inner brake pad against the brake rotor despite wear on the inner brake pad.

13. The sliding caliper brake of claim 12, wherein the restoring spring includes at least one Belleville spring or wave spring.

14. The sliding caliper brake of claim 12, wherein the self-adjusting stroke length mechanism includes the sleeve that retains the restoring spring, and wherein the frictional engagement between the retaining member and sleeve is sufficient to prevent the retaining member from sliding on the sleeve when the restoring spring is compressed a preselected distance equal to about one-half the stroke length of a wear-free inner pad, but insufficient to prevent said retaining member from sliding on said sleeve when the restoring spring is compressed beyond said preselected distance.

\* \* \* \* \*